US012085204B2

United States Patent
Smith

(10) Patent No.: US 12,085,204 B2
(45) Date of Patent: Sep. 10, 2024

(54) MOUNTING BRACKET ASSEMBLIES AS WELL AS SUSPENSION ASSEMBLIES, KITS AND METHODS INCLUDING SAME

(71) Applicant: Firestone Industrial Products Company, LLC, Nashville, TN (US)

(72) Inventor: Scott A. Smith, Brownsburg, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 50 days.

(21) Appl. No.: 18/080,685

(22) Filed: Dec. 13, 2022

(65) Prior Publication Data

US 2023/0184352 A1 Jun. 15, 2023

Related U.S. Application Data

(60) Provisional application No. 63/289,474, filed on Dec. 14, 2021.

(51) Int. Cl.
| | |
|---|---|
| *F16L 3/10* | (2006.01) |
| *B60G 11/113* | (2006.01) |
| *B60G 11/28* | (2006.01) |
| *B60R 16/08* | (2006.01) |

(52) U.S. Cl.
CPC .......... *F16L 3/1066* (2013.01); *B60G 11/113* (2013.01); *B60G 11/28* (2013.01); *B60R 16/08* (2013.01); *B60G 2204/4306* (2013.01)

(58) Field of Classification Search
CPC ...... F16L 3/1066; B60G 11/113; B60G 11/28; B60G 2204/4306; B60R 16/08
See application file for complete search history.

(56) References Cited

U.S. PATENT DOCUMENTS

| | | | | |
|---|---|---|---|---|
| 6,264,231 B1 * | 7/2001 | Scully | ................... | B60G 11/113 |
| | | | | 403/373 |
| 2008/0252031 A1 * | 10/2008 | Dudding | ................ | B60G 7/001 |
| | | | | 301/124.1 |
| 2019/0315177 A1 * | 10/2019 | Cho | ....................... | B60G 11/113 |
| 2021/0316586 A1 * | 10/2021 | Stoychev | ............... | B60G 9/003 |
| 2023/0083976 A1 * | 3/2023 | Collyer | ................. | B60G 11/113 |
| | | | | 267/52 |

FOREIGN PATENT DOCUMENTS

| | | | | |
|---|---|---|---|---|
| CN | 106739906 A | * | 5/2017 | |
| WO | WO-0179010 A1 | * | 10/2001 | ............. B60G 11/00 |
| WO | WO-03068540 A1 | * | 8/2003 | ........... B60G 11/113 |

\* cited by examiner

*Primary Examiner* — Drew J Brown
(74) *Attorney, Agent, or Firm* — Thomas R. Kingsbury; Matthew P. Dugan

(57) ABSTRACT

Mounting bracket assemblies including first, second and third bracket members. The first bracket member includes first and second mounting surface portions. The first mounting surface portion engaging a suspension component. The second mounting surface portion defining a receiving zone for receiving a vehicle structure and is disposed along a first side of a first central plane of the receiving zone. A second bracket member includes first and second contact surface portions. The second bracket member is disposed along a second side of the first central plane and along a first side of a second central plane of the receiving zone. A third bracket member includes third and fourth contact surface portions. The third bracket member is disposed along the second side of the first central plane and along a second side of the second central plane. Suspension systems, kits and methods are also included.

20 Claims, 8 Drawing Sheets

MOUNTING BRACKET ASSEMBLIES AS WELL AS SUSPENSION ASSEMBLIES, KITS AND METHODS INCLUDING SAME

This application claims the benefit of priority from U.S. Provisional Patent Application No. 63/289,474, filed on Dec. 14, 2021, the entire contents of which is hereby incorporated herein by reference.

BACKGROUND

The subject matter of the present disclosure broadly relates to the art of vehicle suspension systems and, more particularly, to mounting bracket assemblies for securing suspension components to sprung and/or unsprung masses of vehicles. Suspension assemblies for vehicles, mounting bracket kits and methods of assembly are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring assemblies of non-wheeled vehicles, support structures, height adjusting systems and actuators associated with industrial machinery, components thereof and/or other such equipment. Accordingly, the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as axles or other wheel-engaging members, for example, with a suspension system disposed therebetween. Typically, a suspension system will include a plurality of spring devices as well as a plurality of damping devices that together permit the sprung and unsprung masses of a vehicle to move in a somewhat controlled manner relative to one another. Generally, the plurality of spring devices function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

It is well known for vehicles of some types and kinds to use supplemental suspension springs, which are sometimes referred to in the art as "helper springs", on vehicles in addition to the existing or originally equipped suspension components. As non-limiting examples, such applications and/or uses can include situations in which a vehicle will be fitted with additional equipment (e.g., a snow plow or salt spreader) or routinely transport higher weight loads, for example. It will be appreciated that such supplemental suspension springs can be mounted on existing vehicles and/or existing vehicle structures in any one of a variety of ways and/or using any one of a variety of known mounting arrangements.

One disadvantage of known supplemental suspension systems, however, is that installation of the same often requires substantial disassembly of existing suspension components of the vehicle. This can, in some cases, significantly increase the time and effort involved in installing the supplemental suspension system. Additionally, this can undesirably increase the level of complexity of the installation, which could, in some cases, exceed the capability and/or comfort level of some self-installers.

Additionally, in some cases, components that are disassembled may be discarded and replaced by new components that are supplied with the supplemental suspension system that is being installed on the vehicle. Sometimes, the new components are significantly different than the existing components. However, in many cases the new components are quite similar to the original parts and only include minor changes or modifications thereto, such as for mounting the supplemental suspension system or components thereof on the associated vehicle, for example. In either case, it has been recognized that the wide variation in the structure and configuration of the sprung and unsprung masses of vehicles undesirably results in the development, manufacture and inventory of a large number of different parts and components for mounting or otherwise securing supplemental suspension components on or between the sprung and unsprung masses of such associated vehicles. This can lead to an undesirable increase in the costs associated with the supplemental suspension systems.

As such, it is believed desirable to develop mounting bracket assemblies as well as suspension assemblies, mounting bracket kits and methods of installation using such mounting bracket assemblies that may improve factors such as design, fabrication and/or inventory of components for the manufacture while maintaining or improving time, complexity and/or ease of installation for the installer, and/or that may overcome the foregoing and/or other disadvantages of known arrangements.

BRIEF DESCRIPTION

One example of a mounting bracket assembly in accordance with the subject matter of the present disclosure can be dimensioned to secure an associated suspension component on or along an associated vehicle structure. The mounting bracket assembly can include a first bracket member that can include a first member wall with first and second mounting surface portions. The first mounting surface portion can be dimensioned to operatively engage the associated suspension component and the second mounting surface portion can face opposite the first mounting surface portion. The second mounting surface portion can at least partially define a receiving zone dimensioned to at least partially receive the associated vehicle structure. The receiving zone can have a zone periphery and can include a first central plane oriented in approximate alignment with the first mounting surface portion and a second central plane oriented transverse to the first central plane with the second mounting surface portion disposed substantially entirely along a first side of the first central plane. A second bracket member can include a second member wall with a first contact surface portion and a second contact surface portion disposed in spaced relation to the first contact surface portion. The second bracket member can be disposed along a second side of the first central plane and along a first side of the second central plane with the first and second contact surface portions oriented in tangential relation to the zone periphery. A third bracket member can include a third member wall with a third contact surface portion and a fourth contact surface portion disposed in spaced relation to the third contact surface portion. The third bracket member can be disposed along the second side of the first central plane and along a second side of the second central plane with the third and fourth contact surface portions oriented in tangential relation to the zone periphery.

One example of a suspension system in accordance with the subject matter of the present disclosure can be dimensioned for securement along an associated axle tube of an associated vehicle. The suspension system can include a first bracket member that can include a first member wall with a first mounting surface portion and a second mounting surface portion facing opposite the first mounting surface portion. The second mounting surface portion can at least partially define a receiving zone dimensioned to at least partially receive the associated axle tube. The receiving zone can include a first central plane oriented in approximate alignment with the first mounting surface portion and a second central plane oriented transverse to the first central plane with the first bracket member disposed substantially entirely along a first side of the first central plane. A second bracket member can include a second member wall with a first contact surface portion and a second contact surface portion disposed in spaced relation to the first contact surface portion. The second bracket member can be disposed along a second side of the first central plane and along a first side of the second central plane with the second bracket member oriented such that the first and second contact surface portions are facing the associated axle tube. A third bracket member can include a third member wall with a third contact surface portion and a fourth contact surface portion disposed in spaced relation to the third contact surface portion. The third bracket member can be disposed along the second side of the first central plane and along a second side of the second central plane with the third bracket member oriented such that the third and fourth contact surface portions are facing the associated axle tube. A spring device can be supported on the first mounting surface portion of the first mounting bracket.

One example of a method of installing a suspension system in accordance with the subject matter of the present disclosure along an associated unsprung mass of an associated vehicle can include providing first, second and third bracket members. The first bracket member can include a first member wall with a first mounting surface portion and a second mounting surface portion facing opposite the first mounting surface portion. The second mounting surface portion can at least partially define a receiving zone dimensioned to at least partially receive the associated unsprung mass. The receiving zone can include a first central plane oriented in approximate alignment with the first mounting surface portion and a second central plane oriented transverse to the first central plane. The second bracket member can include a second member wall with a first contact surface portion and a second contact surface portion disposed in spaced relation to the first contact surface portion. The third bracket member can include a third member wall with a third contact surface portion and a fourth contact surface portion disposed in spaced relation to the third contact surface portion. The method can also include positioning the first bracket member along the associated unsprung mass such that the first bracket member is disposed substantially entirely along the first side of the first central plane. The method can further include positioning the second bracket member along a second side of the first central plane and along a first side of the second central plane with the second bracket member oriented such that the first and second contact surface portions are facing the associated unsprung mass. The method can also include positioning the third bracket member along the second side of the first central plane and along a second side of the second central plane with the third bracket member oriented such that the third and fourth contact surface portions are facing the associated unsprung mass. The method can further include securing the second and third bracket members to one another, and securing the first bracket member to the second and third bracket members such that the associated unsprung mass is disposed within the receiving zone in abutting engagement with the first, second and third bracket members.

In some cases, a method according to the foregoing paragraph can further include providing a gas spring assembly, and securing the gas spring assembly along the first mounting surface portion of the first bracket member in spaced relation to the associated unsprung mass.

DETAILED DESCRIPTION

Turning now to the drawings, it is to be understood that the showings are for purposes of illustrating examples of the subject matter of the present disclosure and, as such, are not intended to be interpreted as limiting. Additionally, it will be appreciated that the drawings are not to scale and that portions of certain features, elements and/or structures may be exaggerated for purposes of clarity and/or ease of understanding.

Figure 1:
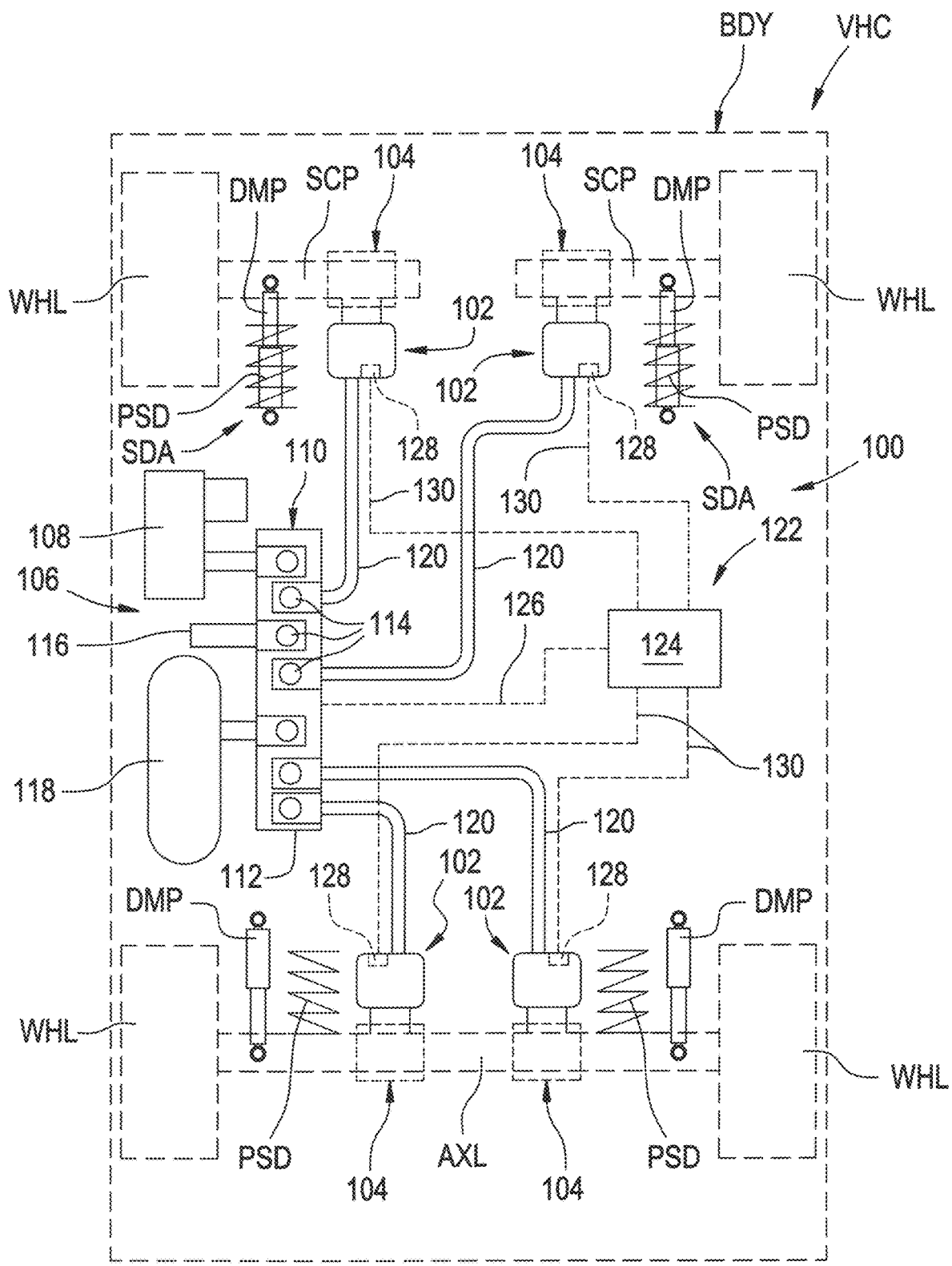
FIG. 1 is a schematic representation of one example of a suspension system of an associated vehicle that includes supplemental suspension assemblies in accordance with the subject matter of the present disclosure.
Figure 2:
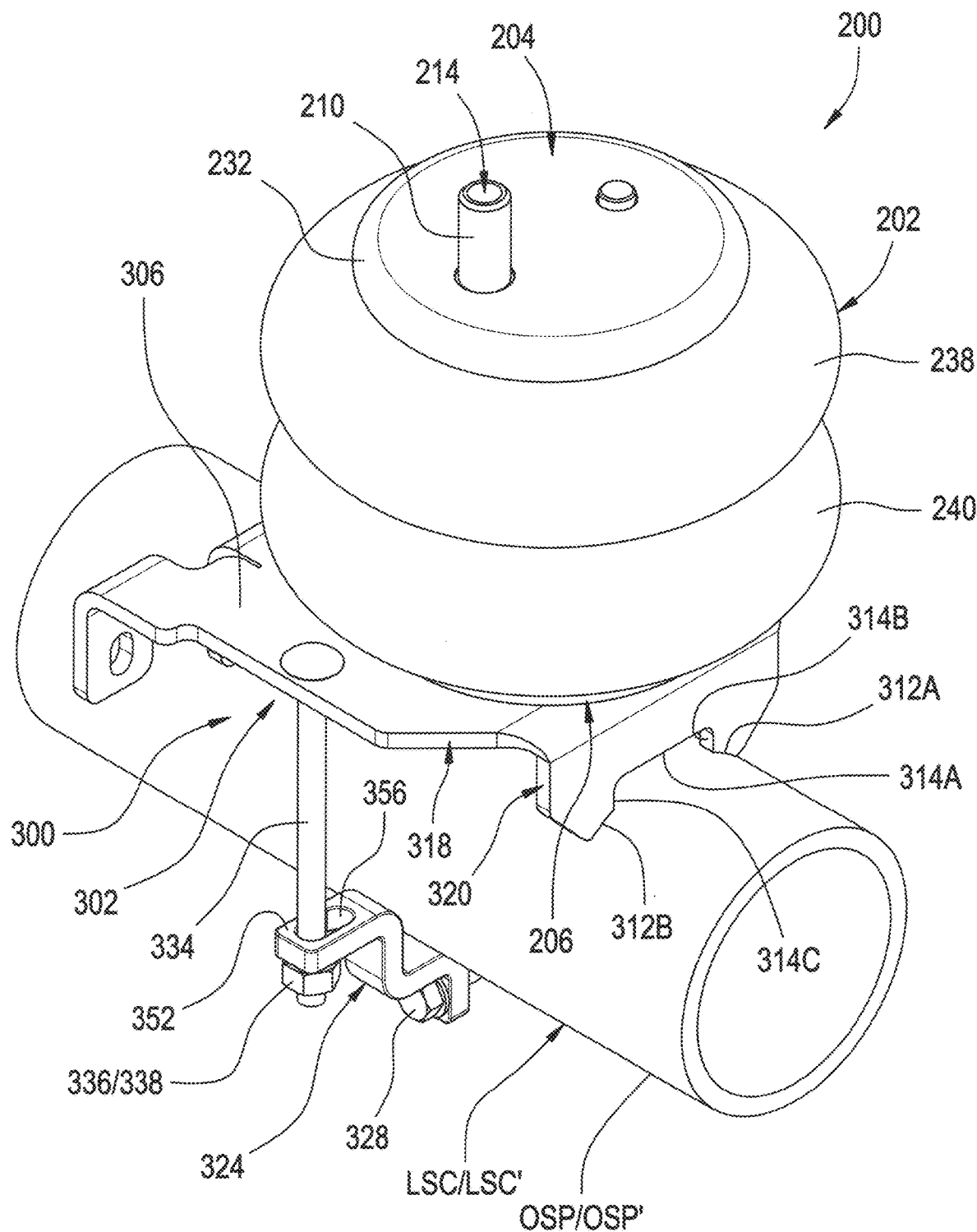
FIG. 2 is a top perspective view of one example of a supplemental suspension assembly that includes a mounting bracket assembly in accordance with the subject matter of the present disclosure.
Figure 3:
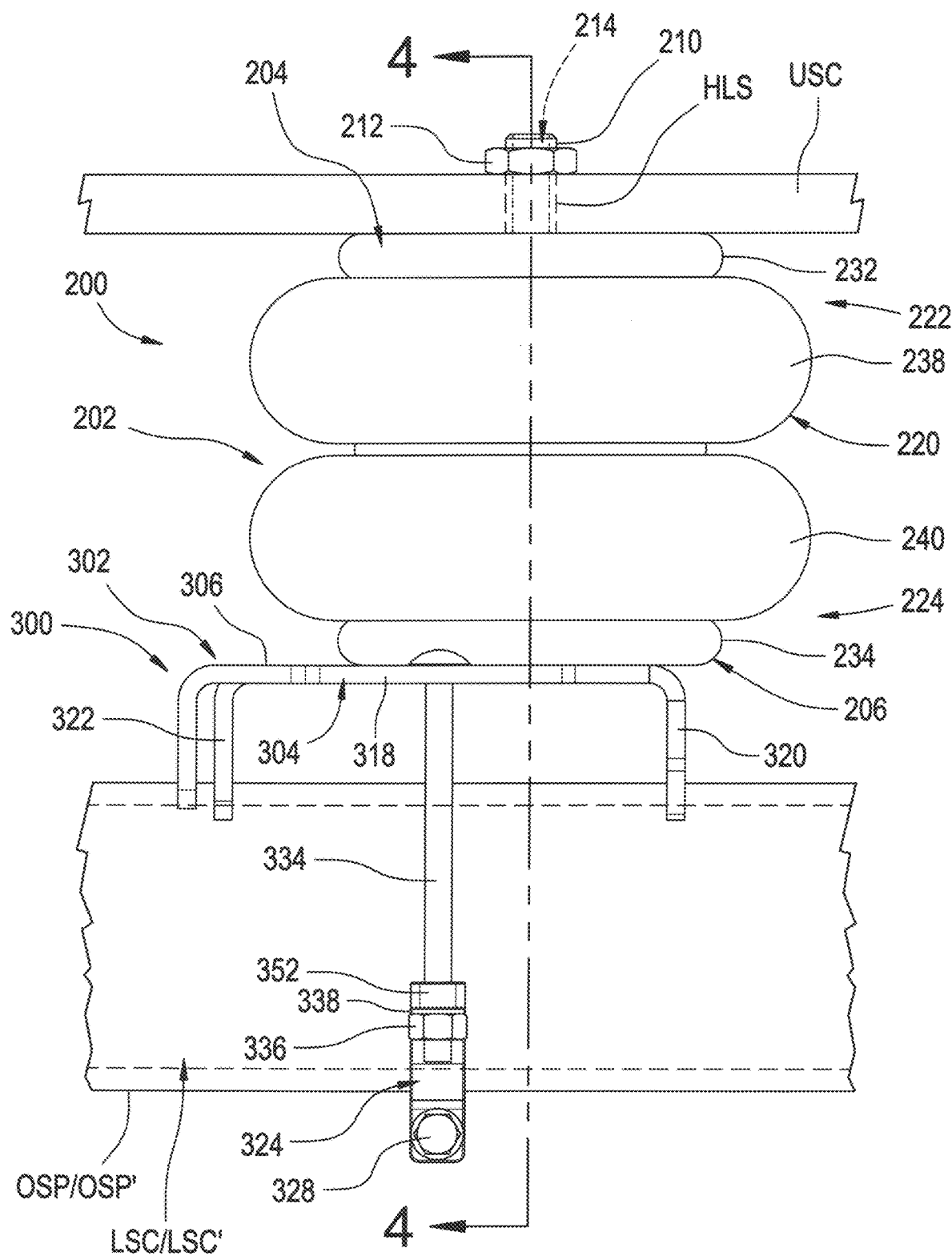
FIG. 3 is a front elevation view of the exemplary supplemental suspension assembly and mounting bracket assembly in FIG. 2.

FIG. 1 illustrates one example of a suspension system 100 disposed between a sprung mass, such as an associated vehicle body BDY, for example, and an unsprung mass, such as an associated axle AXL and/or an associated structural component SCP, for example, that can be operatively connected to an associated wheel WHL of an associated vehicle VHC. It will be appreciated that any one or more of the components of the suspension system can be operatively connected between the sprung and unsprung masses of the associated vehicle in any suitable manner.

For example, suspension system 100 can include a plurality of primary spring devices PSD, such as coil, leaf and/or torsion springs, for example, that are supported between the sprung and unsprung masses of the associated vehicle. Depending on desired performance characteristics and/or other factors, the suspension system may, in some cases, include damping members, such as dampers DMP, for example, of a typical construction (e.g., conventional struts or shock absorbers). In some cases, any such one or more damping members can be provided separately from the primary spring devices, and secured between the sprung and unsprung masses in a conventional manner, such as are included on and/or along axle AXL in FIG. 1, for example. In other cases, the damping members can be assembled together with a primary spring device such that at least a portion of the damping member is axially coextensive with the primary spring device forming spring and damper assemblies SDA, such as are included along structural components SCP in FIG. 1, for example.

In accordance with the subject matter of the present disclosure, suspension system 100 can also include one or more additional suspension components that are secured between the sprung and unsprung masses by way of a mounting bracket assembly in accordance with the subject matter of the present disclosure. For example, suspension system 100 can include one or more secondary or supplemental spring devices 102 that are secured between vehicle body BDY and structural component SCP or axle AXL by way of mounting bracket assemblies in accordance with the subject matter of the present disclosure, which are represented in FIG. 1 by dashed boxes 104. In the arrangement shown in FIG. 1, one secondary spring device 102 and one mounting bracket assembly 104 is disposed toward each corner of the associated vehicle adjacent a corresponding one of wheels WHL. It will be appreciated, however, that any other suitable number of secondary spring devices and/or mounting bracket assemblies could alternately be used in any other configuration and/or arrangement. Additionally, it will be recognized that the secondary spring devices shown in FIG. 1 appear to be of a type and kind commonly referred to as gas spring assemblies having a rolling lobe-type construction. It is to be understood, however, that the secondary spring devices shown and described in connection with FIG. 1 are merely exemplary and that other types, kinds and/or constructions of spring devices (e.g., convoluted-type gas springs) and/or other suspension components (e.g., height sensors, jounce bumpers) could additionally or alternately be included.

In cases in which secondary spring devices 102 are of the type and kind commonly referred to as gas spring assemblies, suspension system 100 can also, optionally, include a pressurized gas system 106 that can be operatively associated with one or more of the secondary spring devices for selectively supplying pressurized gas (e.g., air) thereto and selectively transferring pressurized gas therefrom. In the exemplary arrangement shown in FIG. 1, pressurized gas system 106 includes a pressurized gas source, such as a compressor 108, for example, for generating pressurized air or other gases. A control device, such as a valve assembly 110, for example, is shown as being in communication with compressor 108 and can be of any suitable configuration or arrangement. In the exemplary embodiment shown, valve assembly 110 includes a valve block 112 with a plurality of valves 114 supported thereon. Valve assembly 110 can also, optionally, include a suitable exhaust, such as a muffler 116, for example, for venting pressurized gas from the system. Optionally, pressurized gas system 106 can include a reservoir 118 in fluid communication with compressor 108 and/or valve assembly 110, and suitable for storing pressurized gas at an elevated pressure (i.e., greater than atmospheric pressure) for an extended period of time, such as minutes, hours, days, weeks or months, for example.

Valve assembly 110 can be in communication with secondary spring devices 102 in any suitable manner, such as through suitable gas transfer lines 120, for example. As such, pressurized gas can be selectively transferred into and/or out of the secondary spring devices through valve assembly 110 by selectively operating valves 114, such as to alter or maintain vehicle height at one or more corners of the vehicle, for example.

Suspension system 100 can also include a control system 122 that is capable of communication with any one or more systems and/or components of vehicle VHC and/or suspension system 100, such as for selective operation and/or control thereof. Control system 122 can include a controller or electronic control unit (ECU) 124 communicatively coupled with compressor 108 and/or valve assembly 110, such as through a conductor or lead 126, for example, for selective operation and control thereof, which can include supplying and exhausting pressurized gas to and/or from secondary spring devices 102. Controller 124 can be of any suitable type, kind and/or configuration.

Control system 122 can also, optionally, include one or more height (or distance) sensing devices 128, such as, for example, may be operatively associated with the secondary spring devices and capable of outputting or otherwise generating data, signals and/or other communications having a relation to a height of the secondary spring devices or a distance between other components of the vehicle. Height sensing devices 128 can be in communication with ECU 124, which can receive the height or distance signals therefrom. The height sensing devices can be in communication with ECU 124 in any suitable manner, such as through conductors or leads 130, for example. Additionally, it will be appreciated that the height sensing devices can be of any suitable type, kind and/or construction, such as may operate using sound, pressure, light and/or electromagnetic waves, for example.

Mounting bracket assemblies in accordance with the subject matter of the present disclosure can be used to secure one or more additional suspension components between associated sprung and unspring masses. It will be recognized and appreciated that such additional suspension components can be of any suitable type, kind and/or construction, such as secondary (or supplemental) spring devices, height sensors and/or jounce bumpers for example. As a non-limiting example, secondary spring devices can include spring devices that utilize pressurized gas as the working medium thereof, which are commonly referred to as gas springs or gas spring assemblies. One non-limiting example of a suitable construction of a gas spring assembly that can be used as a secondary spring device (e.g., spring devices 102) is shown and described in connection with FIGS. 2-6. As shown therein, a gas spring assembly 200 is shown as having a longitudinal axis AX (FIG. 4) and can include a flexible spring member 202 extending peripherally about longitudinal axis AX. Gas spring assembly 200 can also include an end member (or end member assembly) 204 that can be secured to the flexible spring member in a suitable manner along one end thereof, such as by way of a crimped connection, for example. Gas spring assembly 200 can also include an end member (or end member assembly) 206 that is secured to the flexible spring member in a suitable manner along an opposing end thereof in spaced relation to end member 204, such as by way of a crimped connection, for example. Flexible spring member 202 can be secured on or along end members 204 and/or 206 in a substantially fluid-tight manner such that a spring chamber 208 (FIG. 4) is at least partially defined by the flexible spring member between the end members.

Gas spring assembly 200 can be disposed between associated sprung and unsprung masses of an associated vehicle in any suitable manner. For example, one end member can be operatively connected to the associated sprung mass with the other end member disposed toward and operatively connected to the associated unsprung mass. A mounting bracket assembly in accordance with the subject matter of the present disclosure can be disposed between and secure one of the end members to the corresponding sprung or unsprung mass that is associated therewith. As such, it will be appreciated that at least one of the end members of the gas spring assembly can include a suitable combination of components and/or structures to operatively connect the end member with a mounting bracket assembly according to the subject matter of the present disclosure.

In the arrangement shown in FIGS. 2-6, for example, end member 204 is secured along a first or upper structural component USC, such as associated vehicle body BDY in FIG. 1, for example. It will be appreciated that the end member can be secured to upper structural component USC in any suitable manner. As one non-limiting example, one or more securement devices 210, such as threaded mounting studs, for example, can be included along end member 204. In some cases, the one or more securement devices can project outwardly from end member 204 and can be secured thereon in a suitable manner, such as, for example, by way of a flowed-material joint (not shown) or a press-fit connection (not identified). In such cases, one or more of securement devices 210 can extend through mounting holes HLS in upper structural component USC and receive one or more threaded nuts or other securement devices 212, for example.

Additionally, one or more gas transfer ports can optionally be provided to permit fluid communication with spring chamber 208, such as may be used for transferring pressurized gas into and/or out of the spring chamber. For example, a connection can be provided on or along one of the end members (e.g., end member 204) such as may be used for attachment of a gas transfer line (e.g., one of gas transfer lines 120 in FIG. 1). In the exemplary arrangement shown in FIGS. 2-6, a passage 214 extends through securement device 210 in fluid communication with spring chamber 208. However, it will be appreciated that other configurations and/or arrangements can alternately be used.

End member 206 can be secured along a second or lower structural component LSC (FIGS. 2-5) or LSC' (FIG. 6), such as may represent one of structural components SCP or axle AXL in FIG. 1, for example, by way of a mounting bracket assembly 300 in accordance with the subject matter of the present disclosure. As identified in at least FIGS. 5 and 6, lower structural components LSC and LSC' can include an outer surface portion OSP and OSP', respectively. As a non-limiting example, one or more securement devices 216, such as threaded passages (e.g., blind passages and/or through passages), for example, can be included along end member 206 and can be secured thereto in a suitable manner, such as, for example, by way of a flowed-material joint (not shown) or a press-fit connection (not identified). As a non-limiting example, securement devices 216 can be oriented such that one or more threaded fasteners 218 (e.g., bolts) can extend through mounting holes in mounting bracket assembly 300 and into cooperative engagement with securement devices 216 to secure end member 206 on or along mounting bracket assembly 300.

Flexible spring member 202 can be of any suitable size, shape, construction and/or configuration. As one example, flexible spring member 202 can include a flexible wall 220 that is at least partially formed from one or more layers or plies (not identified) of elastomeric material (e.g., natural rubber, synthetic rubber and/or thermoplastic elastomer) and can optionally include one or more plies or layers of filament reinforcing material (not shown). Flexible wall 220 is shown extending in a longitudinal direction between opposing ends 222 and 224. In some cases, flexible wall 220 can, optionally, include a mounting bead disposed along either one or both of ends 222 and 224. In the arrangement shown in FIG. 4 mounting beads 226 and 228 are shown as being respectively disposed along ends 222 and 224. In some cases, the mounting beads can, optionally, include a reinforcing device, such as an endless, annular bead core 230, for example.

It will be appreciated, that end members 204 and 206 can be of any suitable type, kind, configuration and/or construction, and that the ends of flexible spring member 202 can be secured on, along and/or otherwise interconnected between end members 204 and 206 in any suitable manner. As one non-limiting example, end members 204 and/or 206 can be of a type commonly referred to as a bead plate. End member 204 is shown as being secured to end 222 of flexible wall 220 using a crimped edge connection in which an outer peripheral edge 232 of end member 204 is crimped or otherwise deformed around mounting bead 226 such that a substantially fluid-tight seal is formed therebetween. Similarly, end member 206 is shown as being secured to end 224 of flexible wall 220 using a crimped-edge connection in which an outer peripheral edge 234 is crimped or otherwise deformed around mounting bead 228 such that a substantially fluid-tight seal is formed therebetween.

Gas spring assembly 200 is shown as being of a type commonly referred to as a convoluted or bellows-type construction, and it will be appreciated that any suitable type or kind of convoluted spring construction can be used. As such, a flexible spring member according to the subject matter of the present disclosure can have any suitable number of one or more girdle hoops that are spaced apart from the ends of the flexible spring member to form a corresponding number of two or more convoluted wall portions. In the exemplary arrangement shown in FIGS. 2-6, flexible spring member 202 includes a girdle hoop 236 disposed approximately midway along flexible wall 220 between ends 222 and 224. A convoluted wall portion 238 extends between girdle hoop 236 and end member 204, and a convoluted wall portion 240 extends between the girdle hoop and end member 206. In a preferred arrangement, girdle hoop 236 is at least partially embedded within flexible wall 220, and can function to retard or otherwise inhibit radially-outward expansion of the flexible wall during use under inflated and/or use conditions.

Mounting bracket assemblies in accordance with the subject matter of the present disclosure (e.g., mounting bracket assemblies 104, 300) are adapted for securement to an associated sprung mass and/or an associated unsprung mass of an associated vehicle. In particular, such mounting bracket assemblies are well suited for securement on or along existing structural components of associated vehicles. As one non-limiting example, lower structural component LSC and/or LSC' can take the form of a structural suspension component or an axle tube, such as is represented in FIG. 1 by structural components SCP and/or axle AXL, for example.

A mounting bracket assembly in accordance with the subject matter of the present disclosure, such as mounting bracket assembly 300, for example, can include any suitable number of one or more components and/or structures suitable for securing the mounting bracket assembly on or along an exterior surface portion (e.g., outer surface portion OSP and/or OSP') of an associated structural component (e.g., lower structural component LSC and/or LSC'). As a non-limiting example, mounting bracket assembly 300 can include a bracket member (or mounting bracket) 302 dimensioned to receivingly engage an additional or supplemental suspension component (e.g., gas spring assembly 200). Additionally, bracket member 302 is dimensioned to operatively engage an associated vehicle component (e.g., lower structural component LSC and/or LSC') such that the additional or supplemental suspension component (e.g., gas spring assembly 200) can be at least partially secured on or along the associated vehicle component (e.g., lower structural component LSC and/or LSC') using bracket assembly 300.

Figure 4:
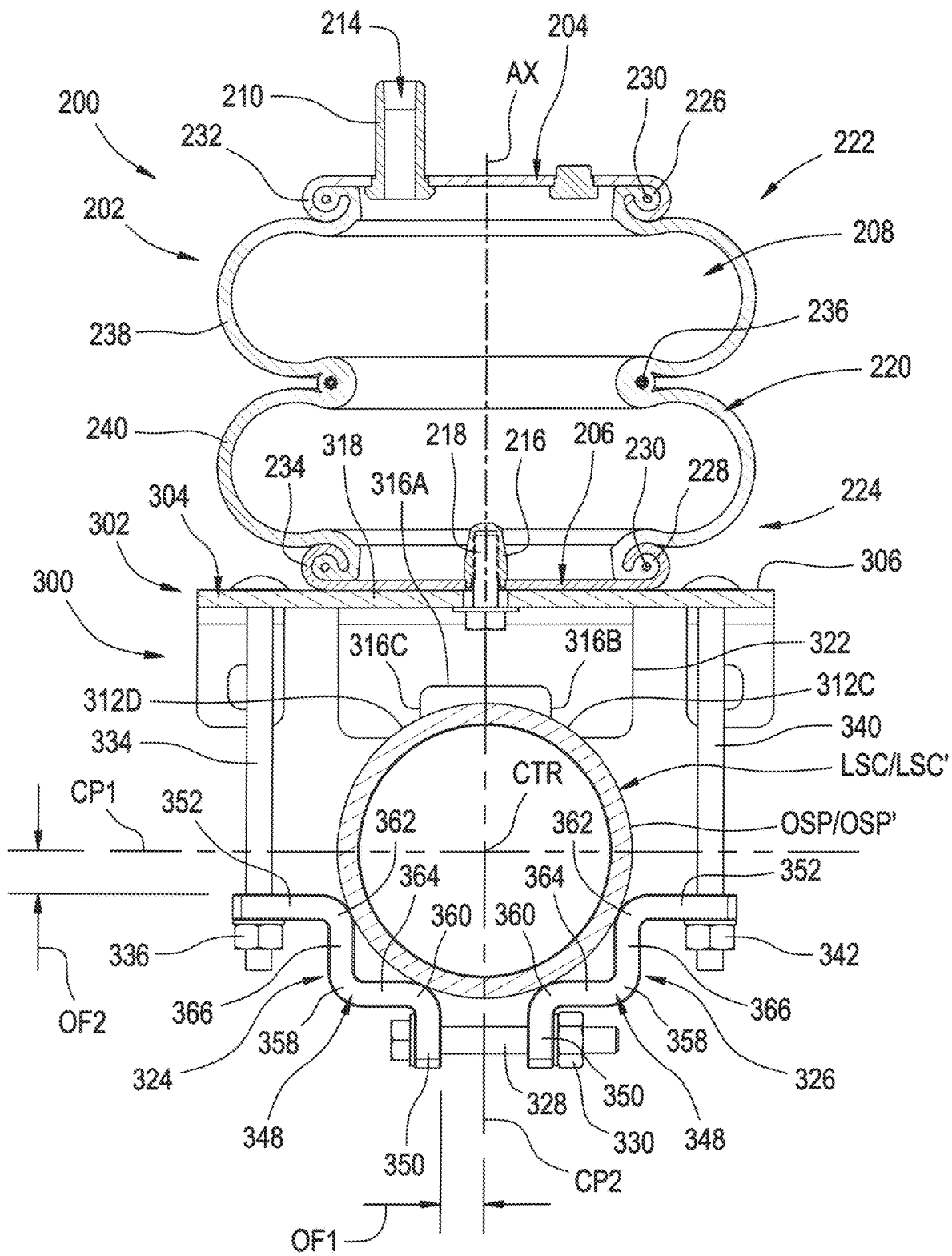
FIG. 4 is a cross-sectional side elevation view of the exemplary supplemental suspension assembly and mounting bracket assembly in FIGS. 2 and 3 taken from along line 4-4 in FIG. 3.
Figure 5:
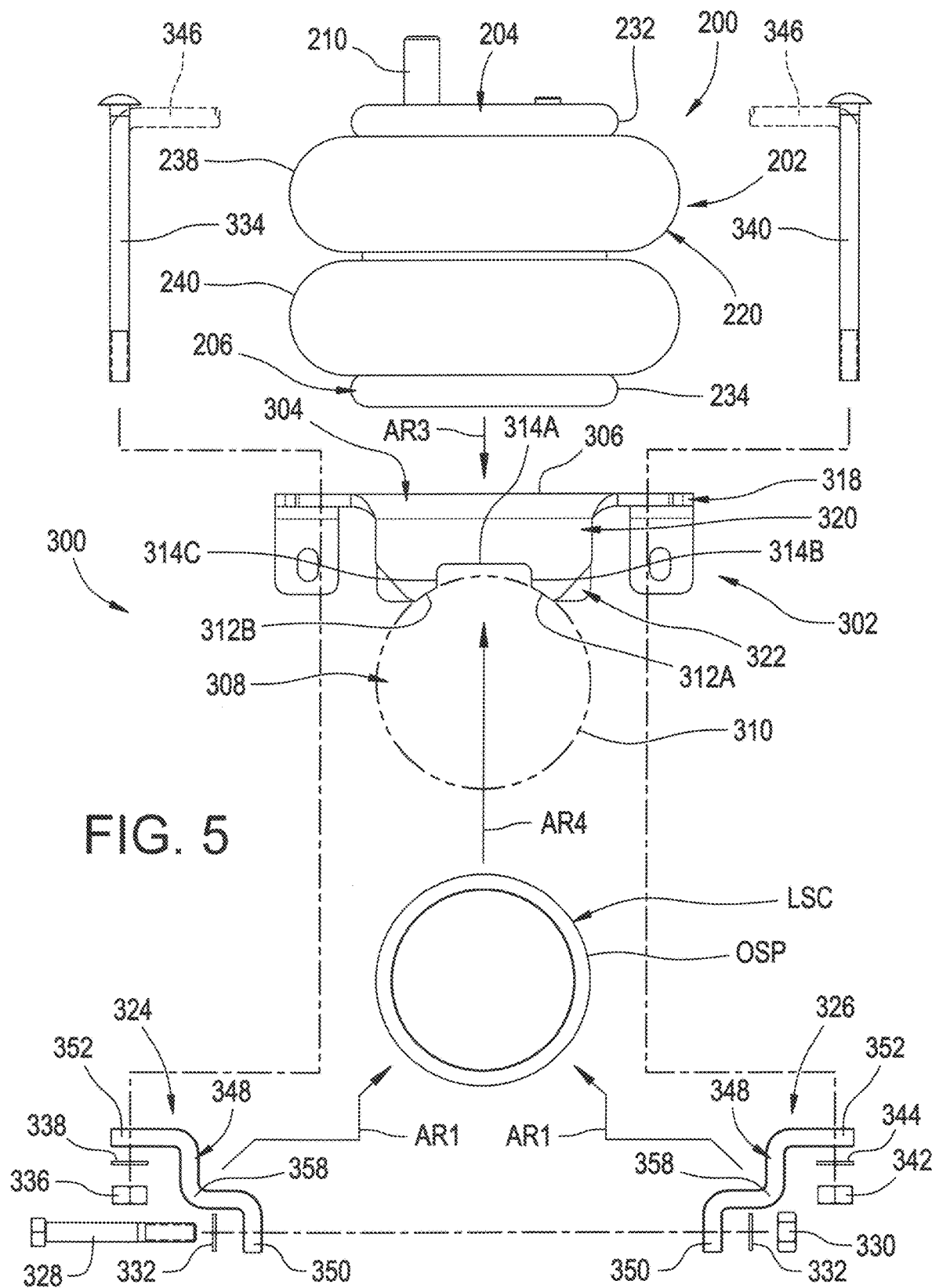
FIG. 5 is an exploded view of the exemplary supplemental suspension assembly and mounting bracket assembly in FIGS. 2-4 operatively associated with one exemplary axle tube.

Bracket member 302 can include a bracket wall 304 with a surface portion 306 facing away from the associated vehicle component (e.g., lower structural component LSC and/or LSC') that is dimensioned to operatively engage the additional or supplemental suspension component (e.g., gas spring assembly 200). Bracket wall 304 also includes one or more surface portions that face opposite surface portion 306 and at least partially define a receiving zone that is dimensioned to receive a portion of the associated vehicle component (e.g., lower structural component LSC and/or LSC'). The receiving zone has a zone periphery that is defined by a substantially contiguous extension and/or projection of one or more surface portions of the bracket member defining the receiving zone. One non-limiting example is illustrated in FIGS. 2-5 as bracket member 302 at least partially defining a receiving zone 308 that has a zone periphery 310. As non-limiting examples, bracket wall 304 can include a surface portion 312A, a surface portion 3126, or both surface portions 312A and 3126 that can be extended or otherwise projected to form zone periphery 310 of receiving zone 308, which can act as a boundary or area within which the associated vehicle component (e.g., lower structural component LSC) can be at least partially received. In such case, surface portion 312A, or surface portion 312B, or both surface portions 312A and 312B can at least partially define receiving zone 308 and zone periphery 310. Additionally, or in the alternative, bracket wall 304 can, in some cases, include a surface portion 312C, a surface portion 312D, or both surface portions 312C and 312D. As a non-limiting example, any one or more of surface portions 312A-D can have an arcuate cross-sectional shape such that one or more of the surface portions form cylindrical surface segments. In such case, substantially-continuously projecting the one or more surface portions can establish an approximately circular shape of zone periphery 310, such as is represented in FIG. 5, for example.

Figure 6:
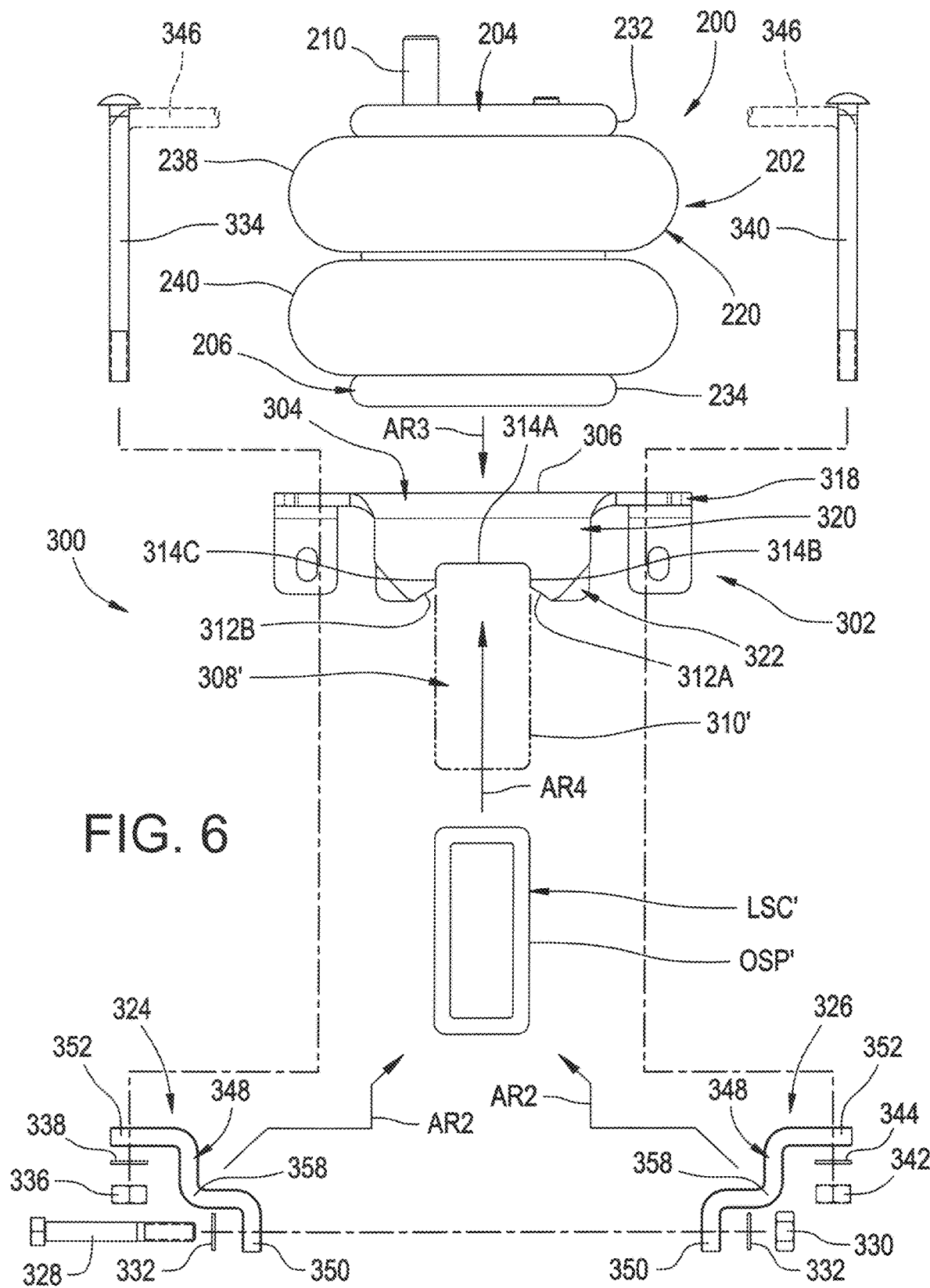
FIG. 6 is an exploded view of the exemplary supplemental suspension assembly and mounting bracket assembly in FIGS. 2-5 operatively associated with a different exemplary axle tube.
Figure 7:
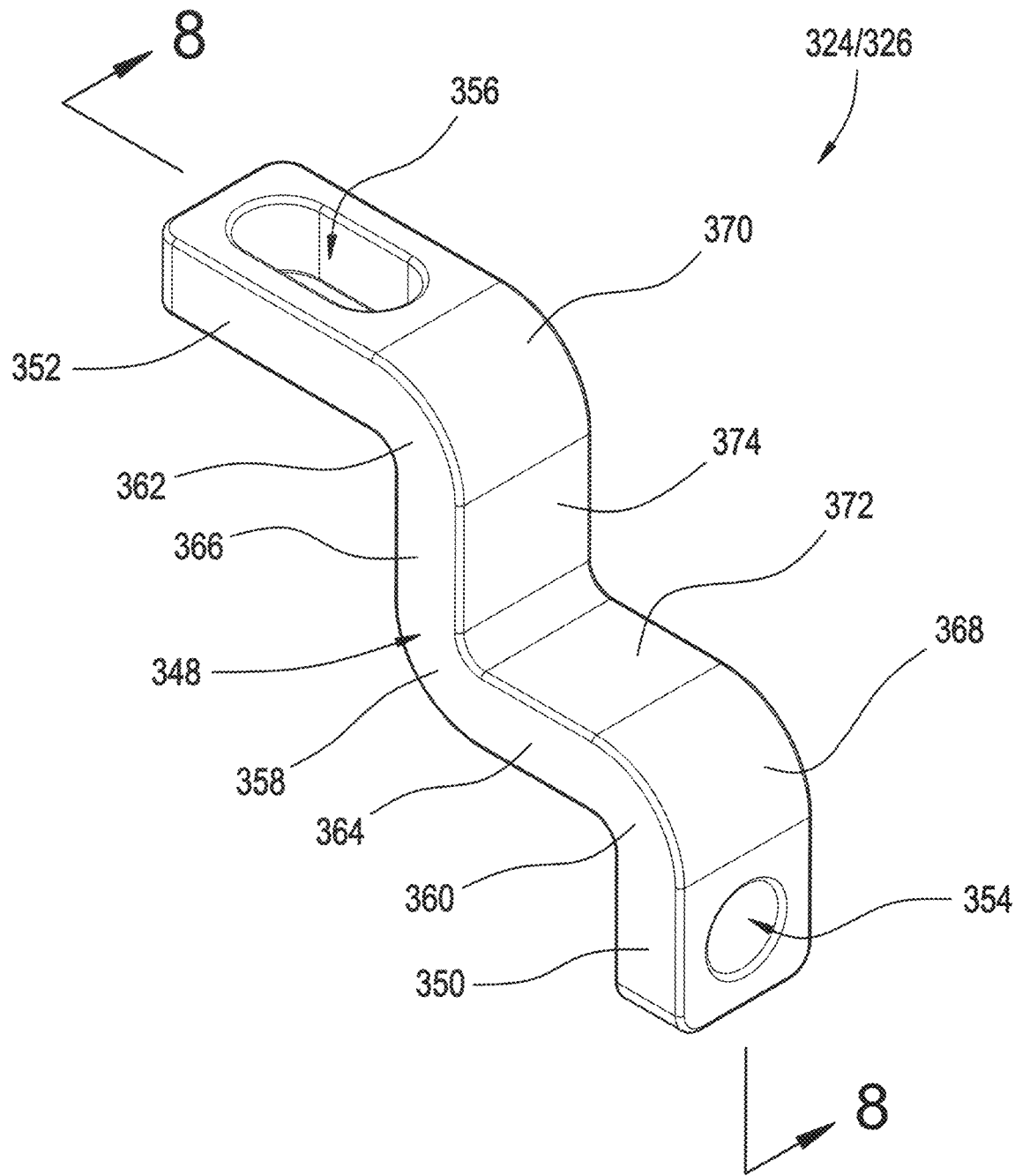
FIG. 7 is a top perspective view of one example of a mounting bracket for use in connection with a mounting bracket assembly in accordance with the subject matter of the present disclosure, such as is shown in FIGS. 2-6.

Another non-limiting example is illustrated in FIG. 6 as bracket member 302 at least partially defines a receiving zone 308' with a zone periphery 310' that has a generally rectangular cross-sectional shape and/or configuration. In such an arrangement, bracket wall 304 can, as a non-limiting example, include surface portions 314A, 314B and/or 314C that can be extended or otherwise projected to form zone periphery 310' of receiving zone 308' which can act as a boundary or area within which the associated vehicle component (e.g., lower structural component LSC') can be at least partially received. Additionally, or as an alternative to surface portions 314A-314C, bracket wall 304 can, optionally, include surface portions 316A, 316B and/or 316C (FIG. 4) that can be extended or otherwise projected to at least partially form zone periphery 310' of receiving zone 308'. As such, it will be appreciated that receiving zones having a zone periphery of other shapes and/or configurations can alternately be defined by the extension and/or projection one or more surface portions of the mounting bracket, such as receiving zones having a circular-shaped, a square-shaped, a polygonal-shaped or a rectangular-shaped zone periphery, for example.

Bracket member 302 can include any number and/or combination of walls and/or wall portions sufficient to provide at least surface portion 306 on or along which the additional or supplemental suspension component is supported. Additionally, or in the alternative, bracket member 302 can include any suitable number and/or combination of walls and/or wall portions on or along which the one or more surface portions that at least partially define receiving zone 308 together with zone periphery 310 thereof are defined. As such, it will be appreciated that size, shape, configuration and/or arrangement of walls and/or wall portions of bracket member 302 is merely exemplary and that construction of bracket member 302 shown and described herein is merely exemplary. As a non-limiting example, bracket wall 304 can include a base wall portion 318 that includes surface portion 306. Bracket wall 304 can also include an extension wall portion 320 oriented transverse to base wall portion 318 that extends from along the base wall portion in a direction away from surface portion 306. Extension wall portion 320 can include surface portion 312A, or surface portion 312B, or surface portions 312A and 312B. Additionally, or in the alternative, extension wall portion 320 can include any combination of any one or more of surface portions 314A-C. Additionally, or in the alternative to extension wall portion 320, bracket wall 304 can include an extension wall portion 322 oriented transverse to base wall portion 318 in spaced relation to extension wall portion 320. If included, extension wall portion 322 can include surface portion 312C, or surface portion 312D, or surface portions 312C and 312D, such as is shown in FIG. 4, for example. Additionally, or in the alternative, extension wall portion 322 can, optionally, include any combination of any one or more of surface portions 316A-C.

Regardless of the shape, configuration and/or arrangement of the receiving zone (e.g., receiving zone 308 and/or 308') and the zone periphery thereof (e.g., zone periphery 310 and/or 310'), the receiving zone will include a centroid CTR (e.g., a mass center and/or a geometric center) with a central plane CP1 extending through the centroid that is offset from but oriented in approximate alignment with surface portion 306 of bracket member 302 on or along which the additional or supplemental suspension component (e.g., gas spring assembly 200) is supported. Additionally, the receiving zone (e.g., receiving zone 308 and/or 308') includes a central plane CP2 that extends through centroid CTR and is oriented transverse to central plane CP1. In some cases, bracket member 302 can be oriented relative to the associated vehicle component (e.g., lower structural component LSC and/or LSC') such that surface portion 306 and/or central plane CP1 are approximately horizontal relative to the associated vehicle (e.g., vehicle VHC). In such case, central plane CP2 can be oriented approximately vertically relative to the associated vehicle. It will be appreciated, however, that other configurations, orientations and/or arrangements could alternately be used without departing from the subject matter of the present disclosure.

In addition to bracket member 302, mounting bracket assembly 300 includes bracket members (or mounting brackets) 324 and 326 that are secured to one another such as by way of one or more securement devices. As a non-limiting example, such one or more securement devices can include a threaded fastener 328. In some cases, a threaded nut 330 and/or one or more washers 332 can, optionally, be included. It will be appreciated, however, that one or more securement devices of any other suitable type, kind and/or configuration could alternately be used. Mounting bracket assembly 300 also includes one or more securement devices operatively connecting bracket member 324 and/or 326 to bracket member 302. In some cases, one securement device can be operatively connected between bracket member 302 and bracket member 324 with another, different securement device operatively connected between bracket member 302 and bracket member 326. As a non-limiting example, a threaded fastener 334 can extend between and operatively connect bracket members 302 and 324, such as by operatively engaging a threaded nut 336 and one or more washers 338, for example. Additionally, or in the alternative, a threaded fastener 340 can extend between and operatively connect bracket members 302 and 326, such as by operatively engaging a threaded nut 342 and one or more washers 344, for example. Alternately, a single securement device, such as a square or U-shaped fastener 346 (FIGS. 5 and 6), for example, could extend between and operatively connect bracket members 302, 324 and 326 of mounting bracket assembly 300.

Regardless of the configuration and/or arrangement of securement devices used in operatively connecting and securing together bracket members 302, 324 and/or 326, mounting bracket assembly 300 is—in an assembled and/or otherwise installed condition—disposed around and operatively secured on or along the exterior of the associated vehicle component (e.g., lower structural component LSC and/or LSC'). Such securement is accomplished, at least in part, by tensioning the securement devices and/or otherwise clamping the bracket members to one another across central plane CP1 and across central plane CP2 such that the bracket members rigidly operatively engage exterior of the associated vehicle component. In this manner, a mounting bracket assembly in accordance with the subject matter of the present disclosure can be used in connection with associated vehicle components (e.g., lower structural component LSC and/or LSC') having any one of a variety of sizes and/or shapes, such as are represented by the sizes and shapes of receiving zones 308 and 308' together with zone peripheries 310 and 310' respectively thereof. As a non-limiting illustration, adjusting the distance between and/or tension across bracket member 302 on one side of central plane CP1 and bracket members 324 and/or 326 along the other side of central plane CP1 can accommodate associated vehicle components having different heights or configurations in the vertical or heightwise direction. Whereas, adjusting the distance between and/or tension across bracket member 324 on one side of central plane CP2 and bracket member 326 along the other side of central plane CP2 can accommodate associated vehicle components having different widths or configurations in the widthwise direction. In this manner, a single mounting bracket assembly (or a single mounting bracket kit) can be secured on or along lower structural components having different sizes, shapes and/or configurations.

As discussed above, a mounting bracket assembly (e.g., mounting bracket assembly 300) in accordance with the subject matter of the present disclosure includes one bracket member (e.g., bracket member 302) disposed along a first side of central plane CP1 with the remaining two bracket members (e.g., bracket members 324 and 326) disposed along a second side of central plane CP1, such as is illustrated in FIG. 4, for example. Additionally, a mounting bracket assembly (e.g., mounting bracket assembly 300) in accordance with the subject matter of the present disclosure includes one of the two bracket members on the second side of central plane CP1 (e.g., bracket member 324) disposed along a first side of central plane CP2 with the other of the two bracket members on the second side of central plane CP1 (e.g., bracket member 326) disposed along a second side of central plane CP2, such as is illustrated in FIG. 4, for example. In such an arrangement, bracket member 302 is disposed along the first side of central plane CP1 and can, optionally, span across central plane CP2.

It will be appreciated that the two bracket members disposed on or along the second side of central plane CP1 (e.g., bracket members 324 and 326 opposite bracket member 302) can be of any suitable shape, configuration and/or construction and can include any suitable number of walls and/or wall portions. In some cases, the two bracket members can have different sizes, shapes, configurations and/or constructions. In other cases, the two brackets can have substantially similar sizes, shapes, configurations and constructions, such as is shown in FIGS. 2-8, for example. Optionally, the two brackets can be substantially identical to one another such that the two bracket members can be assembled in a mirror-image arrangement in an installed condition of mounting bracket assembly 300.

In the arrangement shown in FIGS. 2-8, bracket members 324 and 326 are at least substantially similar to one another, and will be described in further detail as having a generally common configuration and construction. It will be appreciated, however, that the following description may corresponding to bracket member 324, or to bracket member 326, or to both bracket member 324 and bracket member 326. As such, it is to be recognized and understood that the following description is merely exemplary and that other configurations and/or arrangements could alternately be used without departing from the subject matter of the present disclosure.

It will be appreciated that bracket member 324 can be formed from a single, unitary quantity of material that includes one or more walls and/or wall portions. Alternately, bracket member 324 can, optionally, be assembled together from two or more separate parts or components that together form bracket member 324. Additionally, or in the alternative, bracket member 326 can be formed from a single, unitary quantity of material that includes one or more walls and/or wall portions. Alternately, bracket member 326 can, optionally, be assembled together from two or more separate parts or components that together form bracket member 326.

Figure 8:
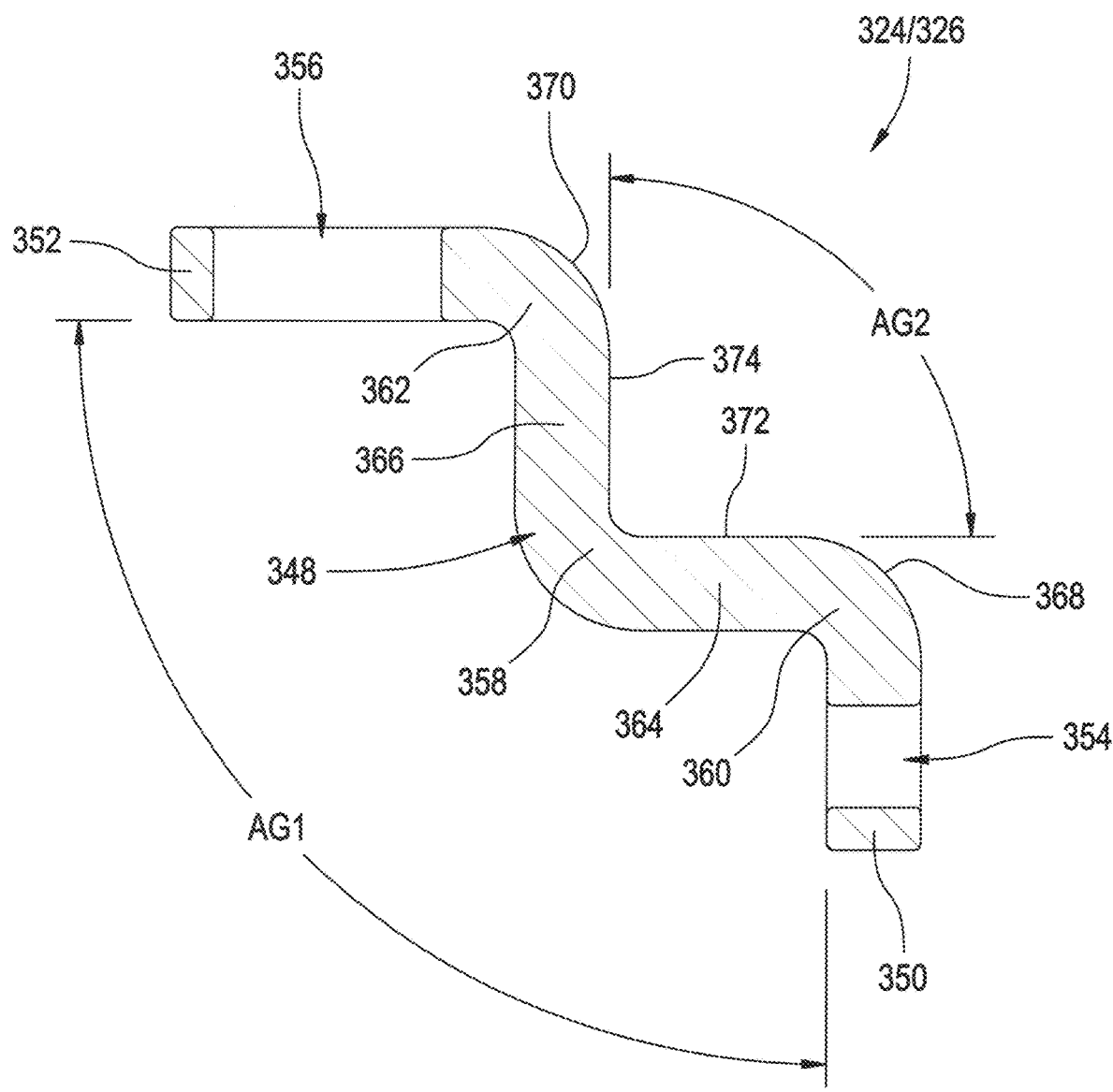
FIG. 8 is a cross-sectional side view of the mounting bracket in FIGS. 2-7 taken from along line 8-8 in FIG. 7.

As one non-limiting example, bracket member 324 and/or bracket member 326 include a bracket wall 348 that includes a flange wall portion 350 and a flange wall portion 352 oriented transverse to flange wall portion 350, such as is represented in FIG. 8 by angular reference dimension AG1. In a preferred arrangement, angle AG1 is within a range of from approximately 30 degrees to approximately 150 degrees. In a more preferred arrangement, angle AG1 can be within a range of from approximately 60 degrees to approximately 120 degrees, with an even more preferred arrangement being within a range of from approximately 80 degrees to approximately 100 degrees. An aperture 354, such as a slot or hole, for example, extends through flange wall portion 350 and can be dimensioned to receive a securement device, such as one of threaded fasteners 328, for example. An aperture 356, such as a slot or hole, for example, extends through flange wall portion 352 and can be dimensioned to receive a securement device, such as one of threaded fasteners 334, 340 and/or 346, for example. Flange wall portions 350 and 352 are operatively connected with one another by a connector wall portion 358 that is disposed between the flange wall portions.

Bracket wall 348 of bracket members 324 and/or 326 can also include a wall portion 360 disposed between flange wall portion 350 and connector wall portion 358 and a wall portion 362 disposed between flange wall portion 352 and connector wall portion 358 generally opposite wall portion 360. If included, wall portions 360 and/or 362 can, optionally, have a generally curved shape or profile. Additionally, or in the alternative to wall portions 360 and/or 362, bracket wall 348 of bracket members 324 and/or 326 can include a wall portion 364 disposed between flange wall portion 350 and connector wall portion 358 and a wall portion 366 disposed between flange wall portion 352 and connector wall portion 358 generally opposite wall portion 360. In the arrangement shown and described herein, bracket wall 348 includes wall portions 360 and 362 as well as wall portions 364 and 366 with wall portion 364 extending approximately linearly between connector wall portion 358 and wall portion 360 and with wall portion 366 extending approximately linearly between connector wall portion 358 and wall portion 362.

In an installed condition, flange wall portions 350 of bracket members 324 and 326 are shown as being oriented in approximate alignment with one another but offset a distance from one another in a direction away from central plane CP2, such as is represented by reference dimension OF1 in FIG. 4. Also, in such an installed condition, flange wall portions 352 of bracket members 324 and 326 are shown as being oriented in approximate alignment with one another. Additionally, or in the alternative, flange wall portions 352 can be disposed in approximate alignment with surface portion 306 of base wall portion 318 of bracket wall 304. In either case, flange wall portions 350 are offset from central plane CP1 in a direction away from surface portion 306, as is represented by reference dimension OF2 in FIG. 4. In this manner, bracket members 324 and 326 can be adjusted toward and away from lower structural component LSC and/or LSC' in a direction extending through central plane CP2, such as by adjusting the length of and/or tension on one or more of threaded fasteners 328, for example. Additionally, bracket members 324 and 326 can be adjusted toward and away from bracket member 302 in a direction extending through central plane CP1, such as by adjusting the length of and/or tension on one or more of threaded fasteners 334, 340 and/or 346, for example.

Bracket members 324 and 326 include two contact surface portions that are spaced apart from one another and dimensioned to be positioned on or along the zone periphery (e.g., zone periphery 310 and/or 310') of the receiving zone (e.g., receiving zone 308 and/or 308') that is at least partially defined by bracket member 302. That is, in a preferred arrangement, two contact surface portions are spaced apart from one another and arranged to abuttingly or at least operatively engage outer surface portion OSP and/or OSP' of lower structural component LSC and/or LSC' in an assembled condition of mounting bracket assembly 300. The two contact surface portions are disposed between flange wall portions 350 and 352 with one contact surface portion disposed on or along one side of connector wall portion 358 (e.g., in a direction toward flange wall portion 350) and the other contact surface portion disposed on or along the other side of connector wall portion 358 (e.g., in a direction toward flange wall portion 352).

It will be appreciated that any suitable configuration and/or arrangement of contact surface portions in accordance with the subject matter of the present disclosure could be used. As one non-limiting example, contact surface portions 368 and 370 can be respectively disposed on or along wall portions 360 and 362. In such cases, contact surface portions 368 and 370 can be dimensioned to be positioned on or at least approximately along a tangent to zone periphery 310 of receiving zone 308, such as to abuttingly or at least operatively engage outer surface portion OSP of lower structural component LSC in an approximately tangential manner as is shown in FIG. 4 and represented in FIG. 5 by arrows AR1. As another non-limiting example, contact surface portions 372 and 374 can be respectively disposed on or along wall portions 364 and 366. In such cases, contact surface portions 372 and 374 can be dimensioned to be positioned on or along zone periphery 310' of receiving zone 308', such as to abuttingly or at least operatively engage an outer surface portion OSP' of lower structural component LSC' as is represented in FIG. 6 by arrows AR2.

As discussed above, the two contact surface portions (e.g., portions 368/370 and/or portions 372/374) are disposed in spaced relation to one another such that the contact surface portions abuttingly or at least operatively engage different areas of lower structural component LSC and/or LSC'. In one arrangement, the relative position of the two contact portions can be at least partially defined by an angle between the distal ends thereof, such as is represented in FIG. 8 by angular reference dimension AG2. In a preferred arrangement, angle AG2 is within a range of from approximately 30 degrees to approximately 150 degrees. In a more preferred arrangement, angle AG2 can be within a range of from approximately 60 degrees to approximately 120 degrees.

An exemplary method of installing a mounting bracket assembly in accordance with the subject matter of the present disclosure (e.g., mounting bracket assembly 300) on or along an associated vehicle component (e.g., lower structural component LSC and/or LSC') can include securing additional or supplemental suspension component (e.g., gas spring assembly 200) on or along a bracket member 302 of the mounting bracket assembly, such as is represented in FIGS. 5 and 6 by arrow AR3. The exemplary method can also include positioning bracket member 302 and the additional or supplemental suspension component (e.g., gas spring assembly 200) such that the associated vehicle component (e.g., lower structural component LSC and/or LSC') is at least partially disposed within receiving zone 308 or 308', such as is represented in FIGS. 5 and 6 by arrows AR4. The exemplary method can further include positioning bracket members 324 and 326 in abutting or at least operative engagement with the associated vehicle component (e.g., lower structural component LSC and/or LSC'), such as is represented by arrows AR1 and AR2 in FIGS. 5 and 6, respectively. The exemplary method can also include securing bracket members 324 and 326 together, such as by using threaded fasteners 328, for example. The exemplary method can further include securing bracket members 324 and 326 to bracket member 302, such as by using threaded fasteners threaded fasteners 334, 340 and/or 346, for example, and thereby securing mounting bracket assembly 300 and the additional or supplemental suspension component on or along the associated vehicle component (e.g., lower structural component LSC and/or LSC').

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

It is to be recognized and appreciated that terms such as "can", "may", "might" and the like are to be interpreted as being permissive rather than required. As such, any reference to items with which terms such as "can", "may", "might" and the like are used shall be interpreted as being optional rather than required by the subject matter of the present disclosure unless otherwise specifically set forth herein.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A mounting bracket assembly dimensioned to secure an associated suspension component on an associated vehicle structure, said mounting bracket assembly comprising:
    a first bracket member including a first member wall with a first mounting surface portion dimensioned to operatively engage the associated suspension component and a second mounting surface portion facing opposite said first mounting surface portion, said second mounting surface portion at least partially defining a receiving zone dimensioned to at least partially receive the associated vehicle structure, said receiving zone having a zone periphery and including a first central plane oriented in approximate alignment with said first mounting surface portion and a second central plane oriented transverse to said first central plane with said second mounting surface portion disposed substantially entirely along a first side of said first central plane;
    a second bracket member including a second member wall with a first contact surface portion and a second contact surface portion disposed in spaced relation to said first contact surface portion, said second bracket member disposed along a second side of said first central plane and along a first side of said second central plane with said first and second contact surface portions oriented in tangential relation to said zone periphery; and,
    a third bracket member including a third member wall with a third contact surface portion and a fourth contact surface portion disposed in spaced relation to said third contact surface portion, said third bracket member disposed along said second side of said first central plane and along a second side of said second central plane with said third and fourth contact surface portions oriented in tangential relation to said zone periphery.

2. A mounting bracket assembly according to claim 1 further comprising a first securement device operatively connecting said first bracket member with at least one of said second and third bracket members.

3. A mounting bracket assembly according to claim 1 further comprising a second securement device operatively connecting said second and third bracket members.

4. A mounting bracket assembly according to claim 1, wherein said second member wall of said second bracket member includes a first contact wall portion at least partially defining said first contact surface portion, a second contact wall portion at least partially defining said second contact surface portion, a first flange wall portion extending from said first contact wall portion, and a second flange wall portion extending from said second contact wall portion, said first and second flange wall portions oriented relative to one another at an included angle within a range of from approximately 30 degrees to approximately 150 degrees.

5. A mounting bracket assembly according to claim 4, wherein said included angle between said first and second flange wall portions is within a range of from approximately 80 degrees to approximately 100 degrees.

6. A mounting bracket assembly according to claim 4, wherein said first flange wall portion is oriented in approximate alignment with said first central plane, and said second flange wall portion is oriented in approximate alignment with said second central plane.

7. A mounting bracket assembly according to claim 4, wherein said first flange wall portion is offset from said first central plane by a first offset dimension in a direction away from said first side thereof.

8. A mounting bracket assembly according to claim 4, wherein said second flange wall portion is offset from said second central plane by a second offset dimension in a direction away from said second side thereof.

9. A mounting bracket assembly according to claim 4, wherein said second member wall includes a connecting wall portion disposed between and operatively interconnecting said first and second contact wall portions such that said connecting wall portion is disposed in spaced relation to said zone periphery.

10. A mounting bracket assembly according to claim 4, wherein said second member wall of said second bracket member includes a first extension wall portion extending from said first contact wall portion and a second extension wall portion extending from said second contact wall portion with said first and second extension wall portions oriented relative to one another at an included angle within a range of from approximately 30 degrees to approximately 150 degrees.

11. A mounting bracket assembly according to claim 10, wherein said included angle between said first and second extension wall portions is within a range of from approximately 60 degrees to approximately 120 degrees.

12. A mounting bracket assembly according to claim 1, wherein said third mounting bracket is substantially similar to said second mounting bracket.

13. A suspension assembly dimensioned for securement along an associated axle tube of an associated vehicle, said suspension system comprising:
a first bracket member including a first member wall with a first mounting surface portion and a second mounting surface portion facing opposite said first mounting surface portion, said second mounting surface portion at least partially defining a receiving zone dimensioned to at least partially receive the associated axle tube, said receiving zone including a first central plane oriented in approximate alignment with said first mounting surface portion and a second central plane oriented transverse to said first central plane with said first bracket member disposed substantially entirely along a first side of said first central plane;
a second bracket member including a second member wall with a first contact surface portion and a second contact surface portion disposed in spaced relation to said first contact surface portion, said second bracket member disposed along a second side of said first central plane and along a first side of said second central plane with said second bracket member oriented such that said first and second contact surface portions are facing the associated axle tube;
a third bracket member including a third member wall with a third contact surface portion and a fourth contact surface portion disposed in spaced relation to said third contact surface portion, said third bracket member disposed along a second side of said first central plane and along a second side of said second central plane with said third bracket member oriented such that said third and fourth contact surface portions are facing the associated axle tube;
a first securement device operatively connecting said first bracket member with at least one of said second and third bracket members;
a second securement device operatively connecting said second and third bracket members; and,
a spring device supported on said first mounting surface portion of said first mounting bracket.

14. A suspension assembly according to claim 13, wherein said second member wall of said second bracket member includes a first contact wall portion at least partially defining said first contact surface portion, a second contact wall portion at least partially defining said second contact surface portion, a first flange wall portion extending from said first contact wall portion, and a second flange wall portion extending from said second contact wall portion with said first securement device extending through said first flange wall portion and said second securement device extending through said second flange wall portion.

15. A suspension assembly according to claim 14, wherein said second bracket member is oriented such that said first flange wall portion is disposed in offset alignment with said first central plane and said second flange wall portion is disposed in offset alignment with said second central plane.

16. A suspension assembly according to claim 14, wherein said second member wall of said second bracket member includes a first extension wall portion extending from said first contact wall portion and a second extension wall portion extending from said second contact wall portion and interconnected with said first extension wall portion by a first connecting wall portion.

17. A suspension assembly according to claim 13, wherein said third member wall of said third bracket member includes a third contact wall portion at least partially defining said third contact surface portion, a fourth contact wall portion at least partially defining said fourth contact surface portion, a third flange wall portion extending from said third contact wall portion, and a fourth flange wall portion extending from said fourth contact wall portion with either said first securement device or a third securement device extending through said third flange wall portion and said second securement device extending through said fourth flange wall portion.

18. A suspension assembly according to claim 17, wherein said third bracket member is oriented such that said third flange wall portion is disposed in offset alignment with said first central plane and said fourth flange wall portion is disposed in offset alignment with said second central plane.

19. A suspension assembly according to claim 17, wherein said third member wall of said third bracket member includes a third extension wall portion extending from said third contact wall portion and a fourth extension wall portion extending from said fourth contact wall portion and interconnected with said third extension wall portion by a second connecting wall portion.

20. A suspension assembly according to claim 13, wherein said spring device is a gas spring assembly that includes a flexible spring member that extends between first and second ends and at least partially defines a spring chamber, a first end member secured across said first end of said flexible spring member such that a substantially fluid-tight seal is formed therebetween, and a second end member secured across said second end of said flexible spring member such that a substantially fluid-tight seal is formed therebetween.

\* \* \* \* \*